United States Patent
Bipes et al.

(10) Patent No.: US 11,182,712 B2
(45) Date of Patent: Nov. 23, 2021

(54) SYSTEM AND METHOD FOR DETERMINING COATING REQUIREMENTS

(71) Applicant: Valspar Sourcing, Inc., Minneapolis, MN (US)

(72) Inventors: Jeffrey D. Bipes, Shoreview, MN (US); William S. Daniel, McKinney, TX (US); Steven S. Bloomberg, Ft. Worth, TX (US); Richard C. Cahill, Port Orange, FL (US)

(73) Assignee: THE SHERWIN-WILLIAMS COMPANY, Cleveland, OH (US)

(*) Notice: Subject to any disclaimer, the term of this patent is extended or adjusted under 35 U.S.C. 154(b) by 0 days.

(21) Appl. No.: 15/511,198

(22) PCT Filed: Sep. 25, 2015

(86) PCT No.: PCT/US2015/052371
§ 371 (c)(1),
(2) Date: Mar. 14, 2017

(87) PCT Pub. No.: WO2016/049536
PCT Pub. Date: Mar. 31, 2016

(65) Prior Publication Data
US 2017/0249576 A1    Aug. 31, 2017

Related U.S. Application Data

(60) Provisional application No. 62/056,204, filed on Sep. 26, 2014.

(51) Int. Cl.
*G06Q 10/00* (2012.01)
*G06Q 10/06* (2012.01)
(Continued)

(52) U.S. Cl.
CPC ....... *G06Q 10/06315* (2013.01); *G01C 11/00* (2013.01); *G06Q 10/06* (2013.01);
(Continued)

(58) Field of Classification Search
CPC ............. G06Q 10/06315; G06Q 10/06; G06Q 30/0611; G06Q 50/08; G06T 7/41;
(Continued)

(56) References Cited

U.S. PATENT DOCUMENTS 3,146,942 A * 9/1964 Gaudier-Pons .......... G06G 1/12
                                                        235/70 R
6,014,221 A * 1/2000 Plude, Jr. ................. G01J 3/46
                                                        356/402
(Continued)

FOREIGN PATENT DOCUMENTS

CN    101849404 A1    9/2010
WO    2013082280 A1    6/2013
(Continued)

OTHER PUBLICATIONS

International Search Report and Written Opinion of the International Application No. PCT/US2015/052371, dated Dec. 28, 2015, 13 pp.
(Continued)

*Primary Examiner* — Rutao Wu
*Assistant Examiner* — Tyrone E Singletary
(74) *Attorney, Agent, or Firm* — Shumaker & Sieffert, P.A.

(57) ABSTRACT

A system and method for determining coating requirements with one or more computer-based systems, which includes receiving image files of a structure (e.g., a building), identifying one or more surfaces of the structure to be coated based on the received image files, determining a surface area for each of one or more surfaces to be coated, receiving
(Continued)

coating application information, calculating a coating amount for each of the one or more surfaces to be coated based on the calculated surface area and the received coating application information, and optionally, communicating the calculated coating amounts.

13 Claims, 5 Drawing Sheets

(51) Int. Cl.
```
G06Q 50/08      (2012.01)
G06Q 30/06      (2012.01)
G06T 7/536      (2017.01)
G06T 7/62       (2017.01)
G01C 11/00      (2006.01)
G06T 7/41       (2017.01)
G06K 9/00       (2006.01)
```

(52) U.S. Cl.
CPC ......... *G06Q 30/0611* (2013.01); *G06Q 50/08* (2013.01); *G06T 7/41* (2017.01); *G06T 7/536* (2017.01); *G06T 7/62* (2017.01); *G06K 9/00577* (2013.01); *G06T 2200/08* (2013.01)

(58) Field of Classification Search
CPC ....... G06T 7/536; G06T 7/62; G06T 2200/08; G01C 11/00; G06K 9/00577
USPC ....................................................... 705/7.25
See application file for complete search history.

(56) References Cited

U.S. PATENT DOCUMENTS

| | | | |
|---|---|---|---|
| 6,037,945 A * | 3/2000 | Loveland | G06Q 10/06 345/420 |
| 8,422,825 B1 | 4/2013 | Neophytou et al. | |
| 8,649,632 B2 | 2/2014 | Neophytou et al. | |
| 2002/0062788 A1 | 5/2002 | Czech et al. | |
| 2004/0193474 A1 * | 9/2004 | Digiacomo | G06Q 30/0203 705/7.32 |
| 2006/0074609 A1 | 4/2006 | Freeman et al. | |
| 2011/0013808 A1 * | 1/2011 | Wolfe | G06T 11/001 382/108 |
| 2011/0243450 A1 * | 10/2011 | Liu | G06K 9/6297 382/190 |
| 2011/0282763 A1 * | 11/2011 | Pesicek | G06Q 30/0635 705/27.1 |
| 2013/0069944 A1 | 3/2013 | Altman et al. | |
| 2013/0202157 A1 | 8/2013 | Pershing | |
| 2014/0139523 A1 | 5/2014 | Neophytou et al. | |
| 2014/0278697 A1 | 9/2014 | Thornberry et al. | |
| 2015/0254861 A1 * | 9/2015 | Chornenky | G01C 15/00 348/135 |
| 2015/0369593 A1 * | 12/2015 | Myllykoski | G06T 7/62 348/136 |
| 2016/0313294 A1 * | 10/2016 | Dattilo | G01N 33/32 |

FOREIGN PATENT DOCUMENTS

| | | | | |
|---|---|---|---|---|
| WO | WO-2013082280 A1 * | 6/2013 | ............... | G06T 7/13 |
| WO | 2014063020 A1 | 4/2014 | | |
| WO | WO-2014063020 A1 * | 4/2014 | ............. | G06T 7/521 |

OTHER PUBLICATIONS

Response to Communication pursuant to Rules 70(2) and 70a(2) dated May 23, 2018, from counterpart European Application No. 15844074.3, filed Nov. 30, 2018, 15 pp.
International Preliminary Report on Patentability from counterpart International Application No. PCT/US2015/052371, dated Apr. 6, 2017, 7 pp.
Examination Report from counterpart Canadian Application No. 2,962,425, dated Jan. 19, 2018, 3 pp.
Extended Search Report from counterpart European Application No. 15844074.3, dated May 4, 2018, 8 pp.
Communication pursuant to Rules 70(2) and 70a(2) dated May 23, 2018, from counterpart European Application No. 15844074.3, 1 pp.
Response to Canadian Office Action dated Jan. 19, 2018, from counterpart Canadian application No. 2,962,425 filed Jul. 19, 2018, 17 pp.
Response to Canadian Office Action dated Dec. 20, 2018, from counterpart Canadian application No. 2962425, filed Jun. 20, 20194, 22 pp.
Examination Report from counterpart Canadian Application No. 2,962,425, dated Dec. 20, 2018, 5 pp.
Examination Report from counterpart Canadian Application No. 2,962,425, dated Dec. 12, 2019, 6 pp.
Response to Examination Report dated Apr. 28, 2020, from counterpart European Application No. 1584407.3, filed Aug. 27, 2020, 40 pp.
First Office Action and Search Report, and translation thereof, from counterpart Chinese Application No. 201580052016.X, dated Jan. 17, 2020, 20 pp.
Response to Examination Report from counterpart Canadian Application No. 2,962,425, dated Apr. 3, 2020, 4 pp.
Examination Report from counterpart European Application No. 15844074.3, dated Apr. 28, 2020, 4 pp.
Examination Report from counterpart Canadian Application No. 2,962,425, dated Oct. 1, 2020, 7 pp.
Response to Examination Report from counterpart Canadian Application No. 2962425 dated Jan. 28, 2021, 22 pp.
Communication under Rule 71(3) Intention to Grant, dated Mar. 11, 2021, from counterpart European Applicantion No. 15844074.3, 7 pages.
Office Action from counterpart Canadian Application No. 2,962,425 dated Aug. 4, 2021, 9 pp.

* cited by examiner

SYSTEM AND METHOD FOR DETERMINING COATING REQUIREMENTS

FIELD

The present disclosure relates to coating applications for providing coating materials, such as paints, stains, and the like, to consumers. In particular, the present disclosure relates to a system for determining coating requirements, such as the amounts of coatings and labor needed to adequately cover surfaces of structures (e.g., homes, commercial buildings, and the like).

BACKGROUND

Paints and stains are often used to protect and decorate surfaces. Stains are transparent or semitransparent solutions or suspensions of coloring agents in a vehicle, and are typically designed to color a surface without hiding it or leaving a continuous film. As a result, the stained substrate (typically a species of wood) is colored, but the grain pattern is generally not hidden. In comparison, paints are usually opaque solutions or suspensions of coloring matter in a carrier, designed to hide or cover a surface with an opaque film.

When calculating an amount of paint or stain needed to coat a building, many factors come in to play, such as the size of the building, the surface conditions, and the type of paint or stain selected. This calculation is typically conducted by measuring the building's perimeter and height to at least grossly estimate the required surface area to coat, and along with a standard coating area/volume for the amount of paint or stain needed (e.g., 400 square feet/gallon of paint).

However, this generic estimate is typically inaccurate, resulting in the painter purchasing too much or too little paint or stain. This can result in wasted time and/or material costs, and can be particularly problematic when using custom paints since it can be difficult to get a precise color match if the original amount runs short. As such, there remains an ongoing desire for tools and techniques that increase estimate accuracies when determining paint and stain amounts needed to adequately coat surfaces.

SUMMARY

An aspect of the present disclosure is directed to a method for determining coating requirements, which includes receiving image files of a structure (e.g., a building), identifying one or more surfaces of the structure to be coated based on the received image files, and determining a surface area for each of one or more surfaces to be coated. The method also includes receiving coating application information, calculating a coating amount for each of the one or more surfaces to be coated based on the calculated surface area and the received coating application information, and optionally, communicating the calculated coating amounts.

Another aspect of the present disclosure is directed to a method for determining coating requirements that includes receiving image files of a structure (e.g., a building), identifying a surface of the structure to be coated based on the received image files, and determining a surface area for the surface to be coated. The method also includes receiving coating application information that includes user efficiency information, calculating a coverage factor for the surface to be coated based on the received coating application information, and calculating a coating amount for the surface based on the calculated coverage factor and the determined surface area. The method further includes receiving feedback information, and updating the user efficiency information based on the received feedback information.

Another aspect of the present disclosure is directed to a computer-based system for determining coating requirements. The computer-based system includes one or more data storage devices configured to receive image files of a structure and to receive coating application information, one or more processors, and a processing module stored on the data storage device(s). The processing module is configured to be operated by the processor(s) to identify one or more surfaces of the structure to be coated based on the received image files, to determine a surface area for each of one or more surfaces to be coated, and to calculate a coating amount for each of the one or more surfaces to be coated based on the calculated surface area and the received coating application information.

Definitions

Unless otherwise specified, the following terms as used herein have the meanings provided below:

The terms "at least one" and "one or more of an element are used interchangeably, and have the same meaning that includes a single element and a plurality of the elements, and may also be represented by the suffix "(s)" at the end of the element. For example, "at least one computer-based system", "one or more computer-based systems", and "computer-based system(s)" may be used interchangeably and have the same meaning. Similarly, at least one processor", "one or more processors", and "processor(s)" may be used interchangeably and have the same meaning. Further, at least one data storage device", "one or more data storage devices", and "data storage device(s)" may be used interchangeably and have the same meaning.

The terms "about" and "substantially" are used herein with respect to measurable values and ranges due to expected variations known to those skilled in the art (e.g., limitations and variabilities in measurements).

The terms "preferred" and "preferably" refer to embodiments of the invention that may afford certain benefits, under certain circumstances. However, other embodiments may also be preferred under the same, or other circumstances. Furthermore, the recitation of one or more preferred embodiments does not imply that other embodiments are not useful, and is not intended to exclude other embodiments from the scope of the invention.

DETAILED DESCRIPTION

The present disclosure is directed to a system and method for determining the amounts of coating materials (e.g., paints and stains) and labor that are needed to adequately cover one or more surfaces of a structure, such as a residential home, commercial building, and the like. For instance, a painting contractor, who desires to paint the exterior of a home, may use the system to quickly determine how much paint will be needed to coat each exterior surface, and/or to quickly determine labor requirements (e.g., time and costs) for performing the coating application. Based on this information, the painting contractor may then provide a cost estimate, order the paint, submit a bid, and the like.

As can be appreciated, determining the amount of paint needed to paint a building can be a complex task using conventional techniques. First, measuring the surface area of each surface to be coated can be difficult and time consuming, particularly for large buildings and those having a large number of different surfaces to coat. Moreover, the amount of paint needed to adequately cover each surface is dependent on multiple interrelated factors, beyond merely knowing the surface area. The system of the present disclosure, however, includes tools to efficiently accomplish these tasks, thereby quickly and accurately determining the amounts of paint or other coating materials needed. Furthermore, the system can also use this information to determine labor time and costs, such as time and costs for preparing the surfaces to be coated (e.g., cleaning), time and costs of the coating application itself, and/or for any post-coating steps.

The following discussion will be made with reference to paint, since the system of the present disclosure is particularly beneficial for painting applications. However, the system may be used in the same manner for any suitable coating material, such as paints, primers, stains, sealers, decorative coatings, anti-skid coatings, waterproof coatings, ultraviolet-resistant coatings, abrasion, wear, and/or impact-resistant coatings, anti-rust coatings, stain-blocking coatings, enamels, and the like.

Figure 1:
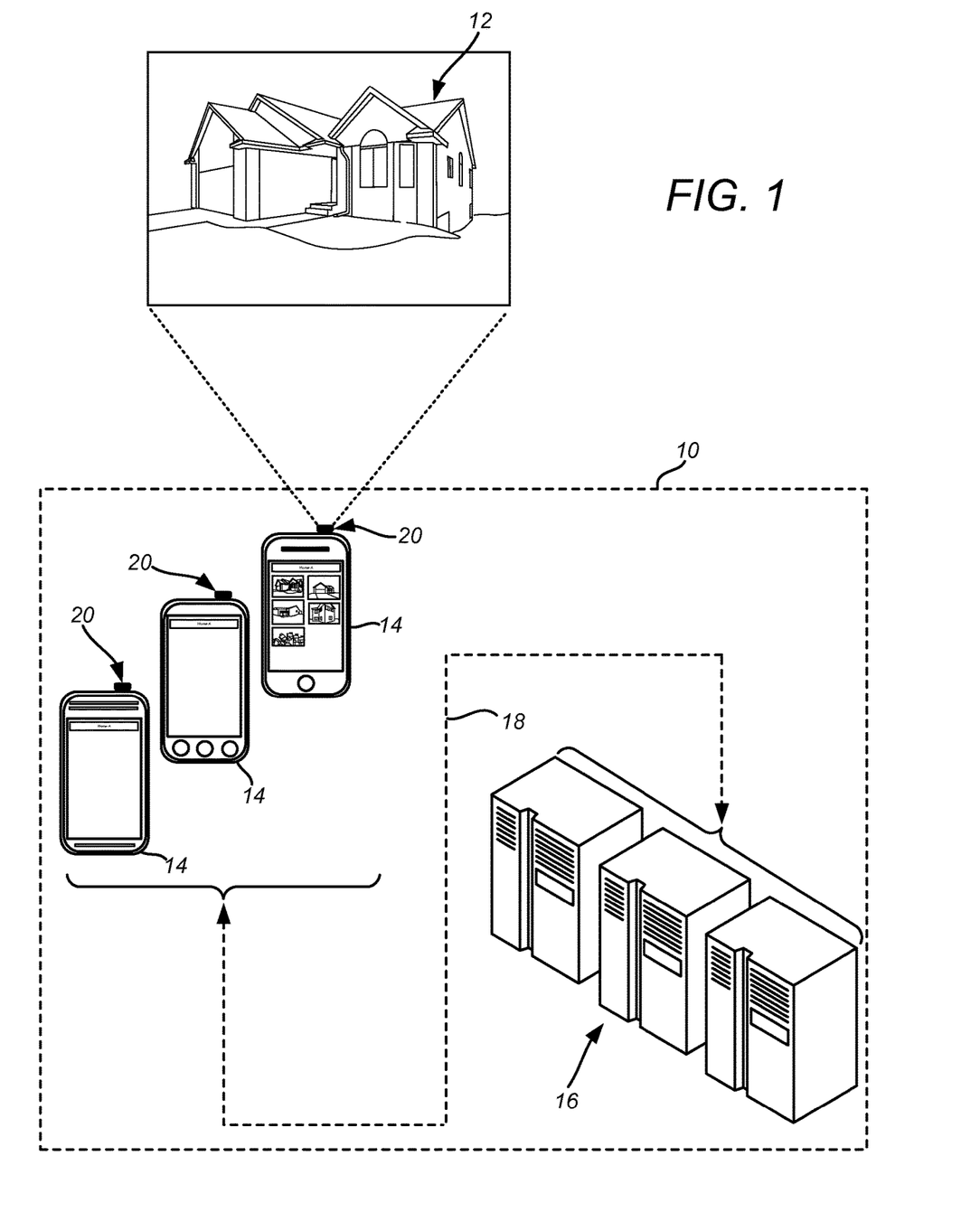
FIG. 1 is a schematic illustration of a system of the present disclosure in use at a residential home.

FIG. 1 illustrates system 10, which is an example system of the present disclosure for determining the amount of paint (or other coating materials) required to coat one or more surfaces of a structure, such as residential home 12. System 10 may also be used for any suitable structure, such as residential buildings (e.g., homes, apartments, and condominiums), commercial buildings (e.g., office buildings and governmental facilities), industrial buildings (e.g., warehouses and manufacturing facilities), agricultural structures (e.g., barns, silos, and fences), transportation structures (e.g., river bridges, overpasses, and noise barriers), entertainment venues (e.g., stadiums and arenas), and the like.

As shown, system 10 may include one or more mobile devices 14 and network center 16, which may communicate over one or more wireless and/or wired communication lines 18, such as cellular and wired wide area networks, Wi-Fi and wired local area networks, and the like. Each mobile device 14 is preferably a portable computer-based system that includes an operating application and one or more cameras 20, such as a digital camera and/or digital video recording device. Alternatively, mobile devices 14 may be configured to receive image files from one or more separate cameras and/or devices.

Network center 16 is one or more remote computer-based systems (e.g., one or more servers) that may perform a variety of different operations in cooperation with mobile devices 14, as discussed below. The computer-based systems of network center 16 may be collectively retained in a single location (e.g., a server room) or spread out over multiple locations (e.g., in different territories of a country and/or the world).

Figure 2:
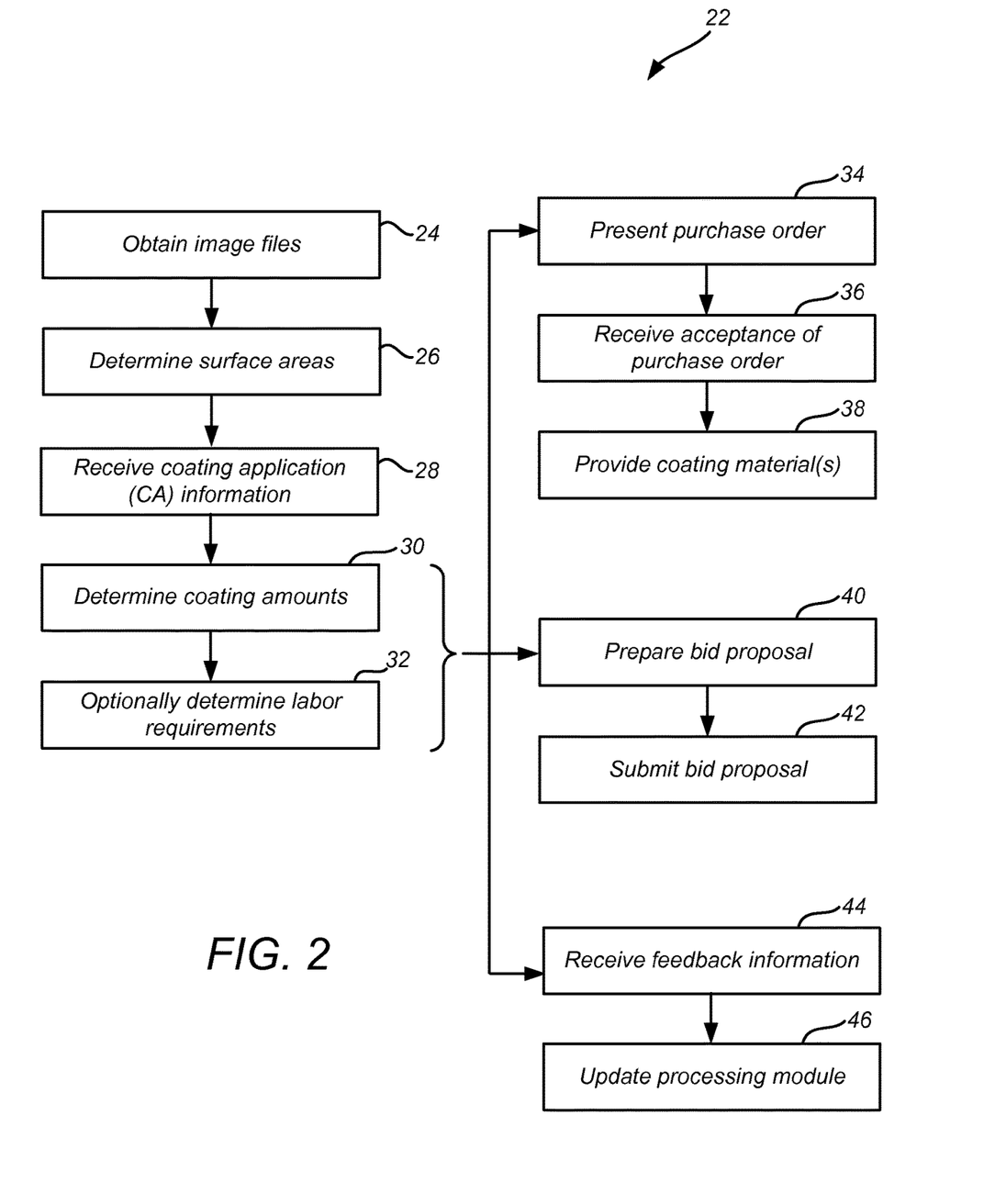
FIG. 2 is a flow diagram of an example method for determining coating amounts needed to adequately cover the surface(s) of the residential home and/or associated labor requirements.

FIG. 2 is a flow diagram of method 22, which is an example method for operating system 10 to determine the amount of paint (or other coatings) needed to adequately cover one or more exterior surfaces of home 12 (or other structure). As shown, method 22 includes optional and example steps 24-46, which may be completed in different sequences, and/or one or more of the steps may be optionally omitted. Furthermore, method 22 may be performed by any combination of mobile device(s) 14 and network center 16 of system 10. In some embodiments, method 22 is performed entirely by one or more mobile devices 14. In other embodiments, method 22 is performed entirely by network center 16. In further embodiments, method 22 is performed by a combination of mobile device(s) 14 and network center 16.

Method 22 may involve obtaining one or more images files of home 12 (step 24), such as with camera 20 and/or from a remote source (e.g., by email, over the internet, and/or through a dedicated service). System 10 may also determine the surface area for each identified surface to be coated (step 26), which may be performed using any suitable technique. An example technique for determining the surface area in step 26 is discussed below (see FIG. 3).

As discussed above, determining the amount of paint needed to adequately cover a surface is a complex task that requires more information than merely the surface area. For example, the initial or existing characteristics of the surface (e.g., surface porosity, surface material type, surface texture, and condition of the surface), the type of paint being applied, the applicator being used, the final surface texture or finish, the changes in color (e.g., dark to light), the environmental conditions, and the painter's skills, techniques, and standards of quality can each impact the amount of paint used during a painting application.

Furthermore, these factors can interrelate with each other, which can compound the complexity of determining the needed paint amounts. For instance, the surface porosity, which can have a substantial impact on the amount of paint needed, can vary greatly depending on the surface material type, the surface material texture, the conditions of the surface prior to painting, and the type of paint selected.

Accordingly, system 10 may receive "coating-application (CA) information" for each identified surface to be coated (step 28), which may be used to determine the amount of paint needed and/or the labor required for the painting application (e.g., preparation and painting time and costs). The CA information for each identified surface to be coated preferably includes (i) information about the initial characteristics of the surface prior to being painted or otherwise coated, (ii) information about the painting or coating application, and (iii) the desired final characteristics of the painted or coated surface. For example, in some embodiments, the CA information may be categorized by the paint type and color selected, the surface porosity, the paint applicator used, the number of coats to be applied, the final texture or finish of the surface after painting, painter efficiencies, and the like.

As discussed below, system 10 may automatically generate one or more features of the CA information and/or may prompt the user to select or input one or more features of the CA information. From there, system 10 may determine the amount of paint (or other coating) needed to adequately cover each identified surface (step 28). In one embodiment, system 10 may optionally use the CA information with a processing module to generate a "coverage factor" for each identified surface. As discussed below, the coverage factor may be a function of a baseline surface coverage for a given amount of paint or other coating material (e.g., based on a selected paint type), and an upward or downward usage variation from this baseline surface coverage due to one or more features of the CA information.

For example, if a given paint type has a baseline surface coverage of 400 square feet/gallon of the paint, and the CA information for a given surface provides an upward usage variation of 22%, the resulting coverage factor is 488 square feet/gallon. System 10 may use the generated coverage factor and the corresponding calculated surface area to determine the amount of paint (or other coating) needed to adequately cover the given surface.

System 10 may also optionally use the CA information to determine the required labor for the painting application (step 32), such time and costs to prepare each identified surface for painting, the time and costs for painting each identified surface, and/or the time and costs for any post-painting steps. In this case, system 10 may optionally use the CA information to generate a "labor factor" for each identified surface, which may, for example, be represented as cost/square feet, time/square feet, and the like, for example.

From there, system 10 can use the paint amounts from step 30, the labor requirements from step 32, or both, for a variety of purposes. In some embodiments, system 10 may optionally operate as a sales center, and can present a purchase order to a user for purchasing the paint and/or for hiring a painter to paint home 12 (step 34). Upon receiving the user's acceptance of the purchase order (e.g., payment) (step 36), system 10 and/or the operator of system 10 may then provide the paint or other coating materials to the purchaser (step 38). The paint (or other coating materials) may be provided to the purchaser in a variety of manners, such as by shipping or delivering the paint to the purchaser and/or to a location designated by the purchaser, by making the paint available for pickup (e.g., at a retail or distribution outlet), and the like.

Additionally, system 10 may optionally prepare a bid proposal for painting home 12 (step 40). For instance, based on the paint amounts from step 30 and/or the labor requirements from step 32, system 10 may automatically generate a bid proposal, such as in a readable format (e.g., PDF file format). System 10 may also optionally submit the bid proposal to a recipient, such as by paper mail, or more preferably by electronic submission (step 42). With respect to electronic submissions, system 10 may transmit the generated bid proposal (e.g., by email) and/or may automatically fill in entries of an electronic submission form.

In some preferred embodiments, system 10 may also receive feedback information about the painting application (step 44), such as information relating to the accuracy of the determined paint amounts, the accuracy of the determined labor requirements, details of the painting application, and the final results of the painting application. For instance, a painter may input information about how accurate the determined paint amount was, such as whether the painter was required to purchase additional amounts of paint for any of the surfaces, and/or if the painter had leftover amounts of the paint for any of the surfaces, as well as the amounts. System 10 may optionally use the received feedback information to update the processing module of system 10 (step 46). The updated processing module may then be used for subsequent determinations of coating amounts and labor requirements in steps 30 and 32.

Figure 3:
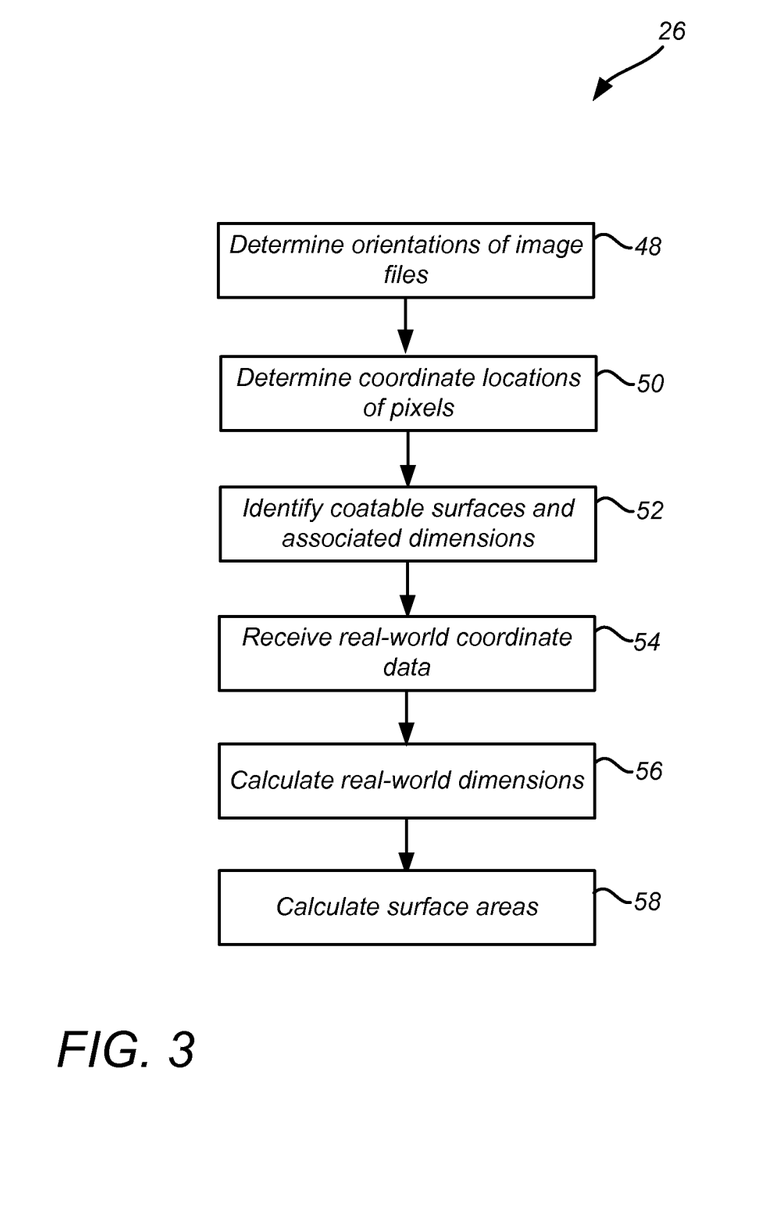
FIG. 3 is a flow diagram of an example step for determining surfaces areas under the example method shown in FIG. 2.

FIG. 3 is a flow diagram for an example technique for determining the surface area in step 26. As shown, step 26 of method 22 may optionally involve steps 48-58. For instance, system 10 may analyze the image files to determine the relative orientations of the received image files (step 48), and determine an x-y-z coordinate location for each pixel or group of pixels in the oriented image files (step 50). In effect, system 10 may generate a three-dimensional digital model of home 12.

System 10 may also analyze the image files (and/or the three-dimensional digital model) to identify the different coatable surfaces of home 12 (step 52), which in the shown example, are exterior surfaces of home 12. System 10 can also correlate the x-y-z coordinate locations of the pixels or groups of pixels (determined in step 50) with the identified coatable surfaces to provide the coordinate dimensions of each identified coatable surface.

At this point, the dimensions of the identified coatable surfaces may be scalar, but not necessarily associated with real-world dimensions. As such, at any suitable point in method 22, system 10 may also receive real-world coordinate data of home 12, such as geocoding data, which can be associated with one or more of the received image files (step 54). Alternatively, system 10 may receive real-world scalar data for one or more surfaces, thereby enabling the non-scalar model to be properly scaled.

In one embodiment, using the received real-world coordinate data and the known scalar dimensions of the identified coatable surfaces, system 10 may calculate the real-world dimensions (e.g., perimeters) for each identified coatable surface (step 56), and from there, calculate the surface area of each identified coatable surface (step 58). Optionally, system 10 may also allow a user to select which surfaces of the identified coatable surfaces will actually be painted, and remove any non-selected surfaces from the set of identified coatable surfaces.

As mentioned above, the steps of method 22 may be completed in different sequences, and/or one or more of the steps may be optionally omitted. For instance, system 10 can receive the real-world coordinate data in step 56 (of step 26) at any point prior to calculating the real-world dimensions in step 56, the coatable surfaces can be identified in step 52 at any point prior to calculating the surface areas in step 58, system 10 can receive the CA information at any point after the coatable surfaces are identified in step 52, and the coating amounts and labor requirements in steps 30 and 32 can be determined in either order, or simultaneously.

As also mentioned above, the step of method 22 may be performed by any combination of mobile device(s) 14 and network center 16 of system 10. Accordingly, mobile devices 14 and network center 16 may collectively function as a single tool for determining needed amounts of paint (or other coating materials) and labor requirements, as well as for placing purchase orders, prepare bid proposals, and performing feedback operations. In view of this, the term "computer-based system", with reference to a system that performs the methods of the present disclosure, may refer to any computer combination of system 10, such as mobile device 14, network center 16, or both.

Figure 4:
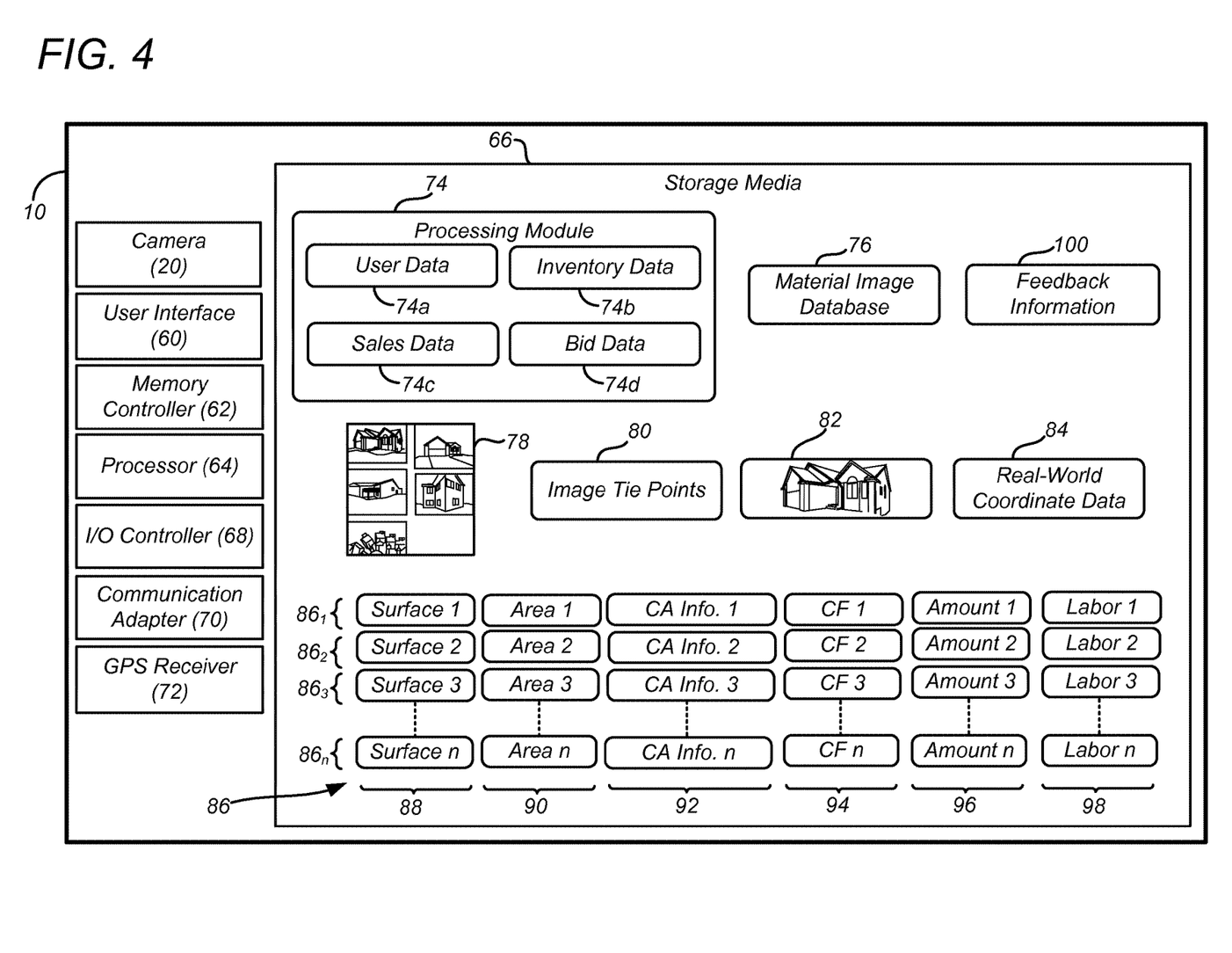
FIG. 4 is a schematic illustration of an example architecture for the system, which further depicts the method for determining the coating amounts and labor requirements.

FIG. 4 illustrates an example architecture for system 10. As shown, system 10 may include camera 20, user interface 60, memory controller 62, processor 64, storage media 66, input/output (I/O) controller 68, communication adapter 70, and GPS receiver 72. Because the steps of method 22 may be performed by mobile device 14, by network center 16, and/or by mobile device 14 and network center 16 in a cooperative arrangement, these hardware components of system 10 may include the components of mobile device 14 and/or network center 16, and may be located at the same computer-based system or across multiple computer-based systems.

System 10 may also include a variety of additional components that are contained in conventional computers, servers, and/or media-player devices. For example, each mobile device 14 of system 10 may optionally be a portable media device, such as a laptop computer, smart phone, portable media player, personal digital assistant (PDA), tablet device, smartwatch, and the like. Correspondingly, network center 16 of system 10 may optionally be a secure center to store information about supplier inventories, purchase orders, and user accounts.

Furthermore, when referring to the steps of method 22 being performed by system 10, mobile device(s) 14, and/or network center 16, it is understood that their respective hardware and software implementations are actually performing the recited steps, such as with one or more of camera 20, user interface 60, memory controller 62, processor 64, storage media 66 and 68, input/output (I/O) controller 68, communication adapter 70, GPS receiver 72, and the like.

User interface 60 may be one or more user-operated interfaces (e.g., keyboards, touch pads, touch-screen displays, display monitors, and other eye, voice, movement, or hand-operated controls) configured to operate system 10. In some embodiments, user interface 60 preferably includes a touch-screen display at mobile device 14. In these embodiments, network center 16 may optionally include a separate user interface 60.

Memory controller 62 may be one or more circuit assemblies that interface the components of system 10 with one or more volatile random access memory (RAM) modules of storage media 66. Processor 64 may be one or more computer-processing units configured to operate system 10, optionally with memory controller 62, and preferably with related processing circuitry (e.g., digital and analog components, and the like).

Storage media 66 is one or more internal and/or external data storage devices or computer storage media for mobile device 14, such as volatile RAM modules, read-only memory modules, optical media, magnetic media (e.g., hard disc drives), solid-state media (e.g., FLASH memory and solid-state drives), analog media, and the like. As mentioned above, the one or more data storage devices of storage media 66 may be located at the same computer-based system (e.g., on mobile device 14 or network center 16) or across multiple computer-based systems (e.g., on mobile device 14 and network center 16).

I/O controller 68 is one or more circuit assemblies that interface memory controller 62, processor 64, and storage media 66 with various input and output components of system 10, including camera 20, user interface 60, communication adapter 70, and GPS receiver 72. In some embodiments, I/O controller 68 may also communicate with one or more external devices, such as for operating a mobile retail unit as discussed in Rubiera, U.S. Publication No. 2014/0114809, the contents of which are incorporated by reference to the extent that they do not conflict with the present disclosure.

Communication adapter 70 is one or more wired or wireless transmitter/receiver adapters configured to communicate over communication lines 18 and/or any external communication lines. GPS receiver 72 is a GPS receiver and may also include additional navigation and motion-based features, such as a digital compass and accelerometers. GPS receiver 72 may be configured to calculate real-world coordinate data based on satellite data, cellular tower data, Wi-Fi data, or combinations thereof. In some embodiments, communication adapter 70 and GPS receiver 72 may each optionally be external to system 10.

In the embodiment shown in FIG. 4, storage media 66 may include processing module 74 and material image database 76. Processing module 74 is a program or application that may be used by system 10 to determine the paint amounts and labor requirements, in addition to any other desired function. Processing module 74 may optionally include information such as user data 74a, inventory data 74b, sales data 74c, bid proposal data 74d, and the like. User data 74a may include account information for each user, and preferably includes an updatable history for each user (e.g., each painter or group of painters) based on their prior painting applications using system 10.

The user may be any suitable person or group of people, such as a homeowner, a painter, a group of painters or other contractors (e.g., a contracting group of painters), an employee of a paint retail company, and the like. For example, in some embodiments, the user may be an operator of a mobile retail unit as discussed in Rubiera, U.S. Publication No. 2014/0114809, or otherwise associated with such a mobile retail unit.

Inventory data 74b may include a database of the available supplier coatings (e.g., paint) and related sundries. One of the factors for determining the amount of paint needed may include the type and color of paint selected by the user. As such, system 10 preferably updates inventory data 74b with the supplier coatings that are currently available to allow the user to select an available paint type and color. Sales data 74c and bid proposal data 74d are additional optional databases for generating purchase orders and bid proposals, as discussed below.

During operation, a user may arrive at the location of home 12 (or other structure), and operate system 10 (e.g., on mobile device 14). The user may also operate camera 20 to capture multiple images of home 12 (or other structure) from different angles. Preferably, camera 20 captures a sufficient number of images of home 12 to show the exterior surfaces that the user intends to paint, and one or more of the captured images are preferably oblique or perspective views to show depth.

System 10 may store the captured images as image files 78 on storage media 66. In alternative embodiments, mobile device 14 may receive image files 78 from a variety of other sources, such as from one or more separate cameras, by electronic communication (e.g., email), and/or from internet websites. In these cases, the image files 78 may be received over communication adapter 70 and stored on storage media 66.

System 10 may orient the images in image files 78 relative to each other with the use of image tie points 80, which are anchor points between the multiple image files 78 that tie the images together. In some embodiments, system 10 may prompt the user to manually select the image tie points 80 in the image files 78, such as by having the user select the same points or surfaces of home 12 in different image files 78. Alternatively, and more preferably, system 10 automatically generates image tie points 80, such as by comparing the pixel arrangements between the image files 78.

For example, each pixel or pixel group in each image file 78 preferably includes color data based on a color model, such as based on an RGB color system, a hexadecimal color model, a LAB color model (e.g., CIE (L*a*b*) color model), a CMYK color model, an (L*c*h*) color model, an IPT color model, an XYZ color model, a spectrophotometric absorption curve, and the like. As such, system 10 may compare the color data patterns in the pixel arrangements between the image files 78, preferably based on expected building designs (e.g., expected corners and angles) to identify common pixels or pixel groups between the surfaces shown in the individual image files 78. This comparison effectively allows system 10 to computationally orient the shown surfaces in image files 78 relative to each other.

System 10 may also determine an x-y-z coordinate location for each pixel or group of pixels in the oriented image files 78. In some embodiments, system 10 may also computationally generate, and optionally render, a three-dimensional digital model 82 of home 12, which may be stored on storage media 66.

System 10 may also analyze image files 78 (and/or digital model 82) to identifying the coatable surfaces of home 12. For example, system 10 may compare the color data patterns in the pixel arrangements within each image file 78 (and/or digital model 82) to identify and distinguish the different coatable surfaces of home 12. In some embodiments, the identified coatable surfaces may be distinguished from each other based on different coatable surface types, such as sidewalls, eaves (e.g., soffits), trims, doors, garage doors, and the like, which can typically vary in paint and labor requirements. These different coatable surface types may optionally be retrieved from material image database 76, which may include a database of known pixel patterns for various coatable surface types and surface materials.

Moreover, large changes in the color data between adjacent pixels or pixel groups can indicate boundaries between distinct surfaces (e.g., between a gray brick surface and a tan vinyl surface). As such, if system 10 identifies a change in color data between adjacent pixels or pixel groups that exceed a threshold value (based on the color model used), system 10 may designate this transition as a boundary between two surfaces. By repeating this process, system 10 may identify each coatable surface of home 12.

In some embodiments, system 10 may also include algorithms that remove obstructing details from the identified coatable surfaces, such as gutters, trees, plants, exterior furniture, and the like during the analysis of image files 78. In this case, system 10 may optionally extrapolate the identified coatable surfaces of home 12 across the regions that are otherwise hidden behind the obstructing details.

System 10 can also correlate the x-y-z coordinate locations of the pixels or groups of pixels with the identified coatable surfaces to provide the coordinate dimensions of each identified coatable surface. As mentioned above, at this point, the dimensions of the identified coatable surfaces may be scalar, but not necessarily associated with real-world dimensions.

As such, system 10 may also receive real-world coordinate data 84 of home 12, such as geocoding data, which can be associated with one or more of the received image files 78, and which may be stored on storage media 66. For example, mobile device 14 may receive a satellite image of home 12 from the internet or from a dedicated service, which preferably includes associated geographic coordinates (e.g., latitude, longitude, elevation, and/or GPS coordinates) of various points of home 12 in the satellite image.

Alternatively (or additionally), the real-world coordinate data 84 may be obtained from mobile device 14 itself, such as from GPS receiver 72 (e.g., GPS coordinates and compass orientations) and camera 20 (e.g., focal settings). From this data, mobile device 14 may triangulate or otherwise determine the location of various points of home 12 in the image files 78 relative to the real-world coordinate location, focal direction, and focal length of camera 20.

In further embodiments, the real-world coordinate data 84 may be obtained from real-world measurements of one or more features of home 12, such as the height of a front door of home 12, the dimensions of a window of home 12, the height of a wall of home 12, and the like. Alternatively, the real-world coordinate data 84 may be obtained from standardized dimensions of one or more features of home 12, such as standardized height of a door of home 12, standardized dimensions of a window of home 12, and the like. In either case, the measured and/or standardized dimensions may then be associated with the image files 78 showing the features.

Moreover, one or more test patterns having known dimensions may optionally be applied to home 12 and/or placed adjacent to home 12 at known distances. For instance, a test line having a known length and/or or a test geometry having known dimensions (e.g., a test rectangle) may be marked or otherwise applied on one or more surfaces of home 12. In some embodiments, the test patterns may be pre-fabricated with known dimensions, and may be temporarily applied (e.g., removably adhered) to one or more surfaces and/or edges of home 12. The known dimensions of these test patterns may then be associated with the image files 78 showing the test patterns.

In some further embodiments of the test patterns, the test patterns may optionally include colors and/or reflectivities that are substantially different from the surfaces of home 12 (e.g., bright fluorescent colors). In this case, when analyzing the image files 78 (as discussed below), system 10 may automatically identify the lengths or shapes of the test patterns by the color differences in the pixels or pixel groups in image files 78, and associate their known dimensions with the image files 78 showing the test patterns.

System 10 may optionally use real-world coordinate data 84 and the known scalar dimensions in digital model 82 (and/or image files 78) to calculate the real-world dimensions for each identified coatable surface of home 12. As mentioned above, real-world coordinate data 84 is associated with points of home 12 in one or more image files 78. System 10 may associate these points of home 12 with the corresponding points in digital model 82 to determine the real-world dimensions of the surface edges in digital model 82 at those points. From there, system 10 may extrapolate the scalar relationship of digital model 82 to each surface edge until the real-world dimension of each surface edge of digital model 82 is determined. Then, based on these calculated real-world dimensions, system 10 may calculate the surface area of each identified coatable surface.

System 10 may also create and save data for the identified coatable surfaces, the calculated surfaces areas, and optionally, any intermediate calculations on storage media 66 as file entries 86 (individually referred as file entries 86$_1$, 86$_2$, 86$_3$, . . . 86$_n$) for "n" identified coatable surfaces. For example, file entries 86 may include data entry columns for surface identification data 88 and surface area data 90, where surface area data 90 may include the calculated surface area for the associated coatable surface.

Surface identification data 88 may include a name for each identified coatable surface, which can be defaulted to Surface 1, Surface 2, Surface 3, . . . Surface n. Alternatively, the names may be associated with the coatable surface type from material image database 76, such as front vinyl siding 1, front trim 1, front trim 2, side vinyl siding 1, front door 1, eave 1, and the like. In some embodiments, surface identification data 88 may be linked (e.g., via data pointers) to the different surfaces on digital model 82, which may allow the user to interact with digital model 82 to select the different identified coatable surfaces.

In some embodiments, system 10 may also include an option to remove one or more of the file entries 86, such as for surfaces that a user does not wish to paint or coat. For example, system 10 may include a menu or other user-selectable option to delete one or more file entries 86. This can simplify the information display, particularly if home 12 includes a large number of exterior surfaces that will not be painted.

For each remaining file entry 86 (e.g., for each identified coatable surface to be painted), system 10 may generate or otherwise receive CA information, as discussed below, where the CA information includes one or more features of the associated surface, and more preferably, includes multiple features of the associated surface. System 10 may store the received CA information for each file entry 86 on storage media 66 as CA information data 92.

Examples of suitable features for the CA information may include the paint type and color selected, the paint applicator used, the surface porosity, the final texture or finish of the surface after painting, the number of coats to be applied, painter efficiencies (e.g., from user data 74a), the environmental conditions for the painting application (e.g., climate, temperature, wind speed, humidity, precipitation, and time of day), and the like. In some embodiments, each feature in CA information data 92 may be represented as an upward or downward usage variation from a baseline surface coverage of the paint. For instance, an example surface porosity for a given surface may be represented as a 19% increase in the amount of paint needed to cover a given surface area, relative to the baseline surface coverage.

Many of the features of the CA information may interrelate with each other, which can increase the complexity in determining the amount of paint needed. For instance, surface porosity may be based on the paint type selected, the surface material, the surface texture, and/or the surface condition prior to being painted. Furthermore, the surface porosity may change after a first coat of paint is applied, such that the coverage of the second coat of paint will be based on a different, and typically reduced, surface porosity.

Moreover the number of coats to be applied can be based on the differences between the texture of the surface prior to being painted and the final texture of the surface after painting (e.g., rough to smooth). In some situations, the number of coats may also depend on the color difference between the initial color of the surface prior to painting and the paint color, particularly when going from a dark colored surface to a light colored paint.

Upon receipt of CA information data 92, system 10 may determine the amount of paint needed to coat the identified coatable surfaces listed in file entries 86 based on the surface area data 90 and the CA information data 92. In one embodiment, system 10 may determine the amount of paint needed by generating a "coverage factor" for each identified coatable surface listed in file entries 86. System 10 may then store the generated coverage factor for each file entry 86 on storage media 66 as CF data 94. CF data 94 for each file entry 86 may be a function of a baseline surface coverage for a given amount of paint or other coating material (e.g., based on a selected paint type), and an upward or downward usage variation from this baseline surface coverage.

As mentioned above, in some embodiments, each feature in CA information data 92 may be represented as an upward or downward usage variation from a baseline surface coverage of a paint (or other coating material). In these embodiments, system 10 may optionally multiply the usage variations of the features together, along with the baseline surface coverage, to provide the coverage factor for a given surface, such as shown in example Equation 1:

$$CF_i = \prod_m^1 \left(1 + \frac{UV\%}{100}\right)_j * (\text{Baseline Surface Coverage}) \quad \text{(Equation 1)}$$

where $CF_i$ is the coverage factor for Surface "i" in data entries 86, "m" is the total number of features in CA information data 92, "UV %" is the upward or downward usage variation for each feature in CA information data 92 (represented as a variation percentage), and "Baseline Surface Coverage" is the baseline surface coverage of the paint, which may optionally be set based on the paint type selected in CA information data 92. Examples of suitable baseline surface coverages may range from about 100 square-feet/gallon of paint to about 500 square-feet/gallon of paint.

For example, if CA information 92 for a given example Surface 1 includes a surface porosity usage variation of 20%, an applicator type usage variation of 5%, a final surface texture usage variation of 7%, a painter efficiency usage variation of −5%, and a base surface coverage of 400 square-feet/gallon of paint, Equation 1 may be represented as follows:

$$CF_1 = \quad \text{(Equation 2)}$$
$$\left(1 + \frac{20}{100}\right)\left(1 + \frac{5}{100}\right)\left(1 + \frac{7}{100}\right)\left(1 + \frac{-5}{100}\right) * \left(\frac{400 \text{ sq. ft.}}{\text{gallon}}\right)$$

which simplifies to:

$$CF_1 = (1.20)(1.05)(1.07)(0.95) * \left(\frac{400 \text{ sq. ft.}}{\text{gallon}}\right) = \quad \text{(Equation 3)}$$
$$1.28 * \left(\frac{400 \text{ sq. ft.}}{\text{gallon}}\right) = \frac{512 \text{ sq. ft.}}{\text{gallon}}$$

System 10 may then use the generated coverage factors and the corresponding calculated surface areas to determine the amount of paint (or other coating) needed to adequately cover each surface listed in file entries 86. For the above-shown example in Equations 2 and 3, and for a surface area of 1,220 square feet for example Surface 1, the resulting amount of paint needed to adequately cover Surface 1 may be calculated by combining these values to achieve a total amount of about 2.4 gallons of paint.

System 10 may then store the determined paint amount on storage media 66, for each file entries 86, as paint amount data 96. The paint amounts in paint amount data 96 may be represented in terms of volumetric units (e.g., gallons or liters), the number of paint containers (e.g., x number of 5-gallon paint containers, and/or y number of 1-gallon containers), in terms of weight or mass units (e.g., kilograms), and the like. In some embodiments, the paint amounts in paint amount data 96 may also (or alternatively) be represented in terms of an itemized and/or a total purchase price for the determined paint amounts.

In addition, in some embodiments, system 10 may also use surface area data 90, CA information data 92, CF data 96, and/or paint amount data 96 to determine the required labor times and/or costs for performing the painting applications, such as for preparing each surface (e.g., cleaning each surface), for painting each surface, and/or for any post-painting steps. As mentioned above, in some embodiments, system 10 may optionally use CA information data 92 to generate a "labor factor" for each identified surface, which may, for example, be represented as cost/square feet, time/square feet, and the like. System 10 may optionally use the generated labor factors and the calculated surface areas to determine the labor requirements needed to paint each surface listed in file entries 86. System 10 may then store the determined labor requirements on storage media 66, for each file entry 86, as labor data 98.

System 10 can then use the paint amount data 96 and/or the labor data 98 for a variety of purposes. For instance, system 10 can display the resulting paint amount data 96 and/or the labor data 98 on user interface 60 (e.g., on a display of mobile device 14) for a user to review. In other examples, system 10 may transmit the paint amount data 96 and/or the labor data 98 to another device (e.g., by email), and/or may print out the paint amount data 96 and/or the labor data 98.

In some embodiments, system 10 may optionally operate as a sales center, such as with the use of sales data 74c, and can present a purchase order to a user for purchasing the paint (and optionally, related sundries) and/or for hiring a painter or group of painters to paint home 12. In these embodiments, sales data 74c may include information for generating purchase orders based on the calculated paint amount data 96 and/or the labor data 98. Upon receiving the user's acceptance of the purchase order (e.g., payment), system 10 and/or the operator of system 10 may then provide the paint or other coating materials to the purchaser, as discussed above.

System 10 may also optionally prepare a bid proposal for painting home 12. For instance, system 10 may automatically generate a bid proposal, such as in a readable format (e.g., PDF file format), based on the calculated paint amount data 96 and/or the labor data 98. The generated bid proposal may be stored on storage media 66 as bid data 74d. System 10 may also optionally submit one or more bid proposals of bid data 74d to recipients, such as by paper mail, or more preferably by electronic submission. As mentioned above, with respect to electronic submissions, system 10 may transmit the generated bid proposals, such as by email, and/or may automatically fill in entries of an electronic submission form.

In some preferred embodiments, system 10 may also receive feedback information about the painting application. For instance, system 10 may provide a menu or other option that allows the user (e.g., the painter or group of painters) to provide feedback information relating to the accuracy of the determined paint amounts, the accuracy of the determined labor requirements, details of the painting application, and the final results of the painting application. For instance, a painter may input information about how accurate the determined paint amount was, such as whether the painter was required to purchase additional amounts of paint for any of the surfaces, and/or if the painter had leftover amounts of the paint for any of the surfaces, as well as the amounts.

System 10 may also receive the feedback information from other sources, such as when the user purchases additional amounts of paint (e.g., if the calculated amount was not sufficient). The user may also provide feedback information by revising any of the originally-entered information for CA information data 92. For example, the user may note if a different painting applicator was used for any surface, if a surface was different from originally expected (e.g., different material, texture, or condition), if a different number of coats were applied from what was originally anticipated, if the environmental conditions or time of day changed, and/or if a different painter performed the painting application on any of the surfaces.

System 10 may store the received feedback information on storage media 66 as feedback information data 100, and may optionally use the feedback information data 100 to update processing module 74 (e.g., update user data 74a). As mentioned above, user data 74a may include an updatable history for each user (e.g., each painter or group of painters) based on their prior painting applications using system 10. The amount of paint needed to coat a given surface can be highly dependent on a painter's skills, techniques, and standards of quality, and can vary between each individual painter and/or between groups or teams of painters. As such, the updatable history for each user may be based on individual painters and/or groups of painters, and may be used in determining the amount of paint needed to coat the identified coatable surfaces listed in file entries 86, as well as for determining the labor requirements.

During the update, system 10 may optionally perform a statistical analysis on the feedback information data 100. As can be appreciated, the statistical analysis of the feedback information data 100 from multiple users, particularly where each user submits multiple successive feedback information data 100, can increase the accuracy of processing module 74 over time. In particular, the accuracies of the calculated coverage deviation factors in CF data 94 preferably increase over time, thereby "learning" each user's preferences in a manner that can assist them during subsequent painting applications. In effect, processing module 74 can be tailored to each user based on their particular skills, techniques, and standards of quality.

Figure 5:
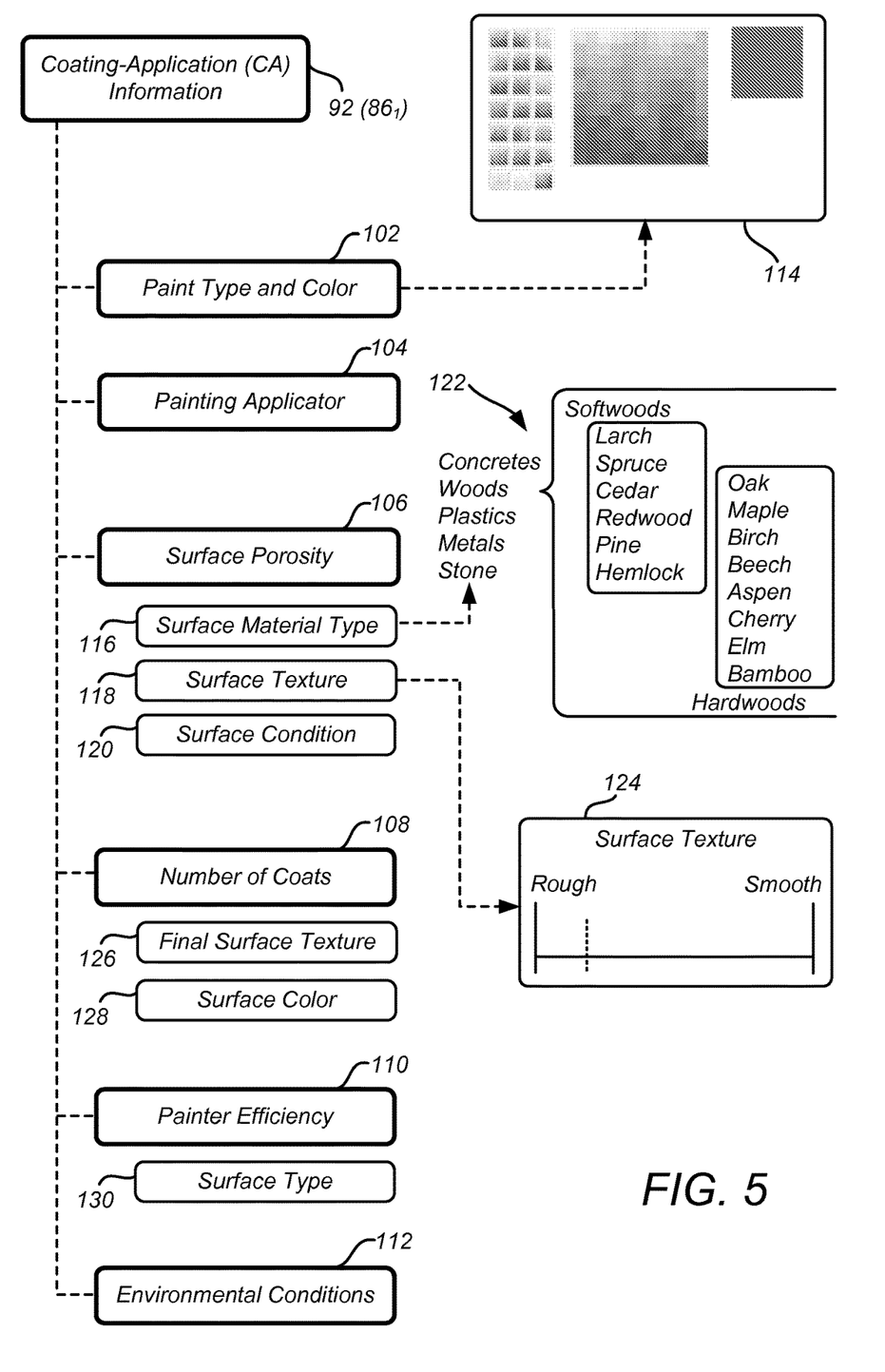
FIG. 5 is a diagram of example coating-application (CA) information that may be used by the system.

FIG. 5 is a diagram of example features for CA information data 92, which is based on an example Surface 1 under file entry 86₁, and may also be used for each file entry 86. In the shown example, the features of CA information data 92 may be categorized by paint type and color 102, painting applicator used 104, surface porosity 106, number of coats of paint 108, painter efficiency 110, and/or environmental conditions 112. CA information data 92 may optionally include other features as desired.

For paint type and color 102, system 10 may prompt the user to select or input the desired coating or paint type and color. In some preferred embodiments, system 10 may provide a digital color palette (e.g., color palette 114) that provides a collection of the available paints. Alternatively, system 10 may provide a configurator menu of the available paints, a scrolling list of the available paints, and/or a text-enterable field. The list of available paints (or other coatings) is preferably updated from inventory data 74b to ensure that the selected paints (or other coatings) are available.

To increase computational accuracies, in some embodiments, the statistical analysis performed by system 10 is directed to a set of known coating or paint compositions, such as those provided by a particular supplier. As can be appreciated, the particular paint composition can significantly impact the amount of paint needed to adequately coat a surface. For instance, the composition can affect how much the paint absorbs into the surface, the number of coats required to apply the paint, the drying times, and the like.

As discussed above, the selected paint type 102 may optionally set the "baseline surface coverage" for determining CF data 94, such as a baseline coverage amount of 400 square-feet/gallon, for example. If desired, the baseline surface coverage may be set for each paint type in inventory data 74*b*, such as based on laboratory results or other recommended values for each paint type.

For painting applicator 104, system 10 may prompt the user to select which type of applicator will be used to paint Surface 1, such as a brush, roller, sprayer, and the like, as well as the dimensions of the selected applicator. The type of applicator used can also affect how much paint is used during the painting application. For instance, some sprayers can require up to about twice as much paint as brushes and rollers. For this feature, system 10 may provide a user-selectable menu of typical applicators and their dimensions, a corresponding scrolling list, and/or a text-enterable field.

Surface porosity 106 is the porosity of the surface (e.g., Surface 1), which can affect to how much paint is absorbed into the surface, and can be a major contributor to the amount of paint used during the painting application. In some embodiments, system 10 may calculate the surface porosity 106 based on a surface material type 116, a surface texture 118, surface conditions 120, and optionally the selected paint type 102. In these embodiments, system 10 may accordingly determine the surface material type 116, surface texture 118, and surface conditions 120 by analyzing image files 78 and/or digital model 82, and comparing them to material image database 76.

For example, as discussed above, each pixel or pixel group in each image file 78 includes color data based on a color model. As such, system 10 may compare the color data patterns in the pixel arrangements for Surface 1 and compare them to the known pixel patterns for various surface materials in material image database 78, such as with an occlusion query. If the compared color data patterns provide a match to a surface material in material image database 78 with a sufficient level of certainty, system 10 may then select this as the surface material type 116 for Surface 1.

In some embodiments, such as if a match with material image database 76 is not reached, system 10 may prompt the user to use camera 20 to capture a close-up image of the surface of home 12 corresponding to Surface 1, preferably in good lighting conditions. System 10 may then store this close-up image on storage media 66, and may compare the color data patterns in the pixel arrangements of the close-up image to the known pixel patterns in material image database 76, such as with an occlusion query. If the compared color data patterns provide a match to a surface material in material image database 76 with a sufficient level of certainty, system 10 may then select this as the surface material type 116 for Surface 1.

If no match is reached, system 10 may prompt the user to input or select the surface material type 116 for the current surface. For example, user interface 60 may provide a configurator menu 122 for selecting surface material type 116 from a series of successive lists that narrow down the available material options. The materials shown in menu 122 of FIG. 5 are merely exemplary and are not intended to limit the selectable material options. In alternative embodiments, menu 122 may be a scrolling list of the available material types, and/or a text-enterable field.

Surface texture 118 refers to the level of roughness or smoothness for Surface 1 prior to being painted. Surface texture 118 is preferably generated by the material selected for surface material type 116, and may, for example, be represented as a sliding scale 124 having a scale from 0 (rough) to 100 (smooth). Alternatively, system 10 may prompt the user to input or select the surface texture 118 for Surface 1, such as with a scrolling list corresponding to sliding scale 124, a scrolling list of texture values (e.g., very rough, rough, moderately rough, moderately smooth, smooth, and very smooth), and/or a text-enterable field.

Surface condition 120 refers to the state of weather, wear, and damage to Surface 1, where newer surfaces typically have good surface conditions, and older surfaces may potentially have moderate to poor surface conditions (e.g., cracked, chipped, abraded, moldy, chalked, and the like). Surface condition 120 may optionally be generated from the color data of the pixel arrangements in image files 78, digital model 82, and/or a close-up image for Surface 1. For example, system 10 may analyze the color data patterns in the pixel arrangements for Surface 1 and look for color anomalies, such as dark lines (potential cracks) and off-colored regions (potential chipped or abraded regions). These surface conditions can impact the labor requirements for preparing Surface 1 for painting, such as if any repair or cleaning work is needed.

Based on the generated or otherwise received values for surface material type 116, the surface texture 118, and/or the surface conditions 120, and optionally the selected paint type 102, system 10 may calculate the surface porosity 106. Alternatively, such as if system 10 is unable to generate surface porosity 106, system 10 may prompt the user to input or select a porosity value for surface porosity 106 for Surface 1. In this case, due to the complexities in accurately determining surface porosity 106, user interface 60 may optionally provide a configurator menu with successive lists or questions to narrow down the available surface materials, surface textures, surface conditions, and/or paint types until a reasonably-accurate porosity value for surface porosity 106 is obtained.

Alternatively, user interface 60 may optionally provide a sliding scale of porosity values. In some further embodiments, system 10 may optionally provide a text-enterable field to allow the user to enter a porosity value for surface porosity 106. However, as can be appreciated, surface porosity 106 can be a very complex and difficult feature to accurately calculate, particularly due to the interrelationship between the surface material type 116, the surface texture 118, and/or the surface conditions 120, and the selected paint type 102. As such, system 10 can function as an updatable surface porosity database for a variety of users.

Surface porosity 106 can optionally be represented as an upward usage deviation from a baseline surface coverage. Examples of suitable upward usage deviations for surface porosity 106 may range from 0% to 50%, from 0% to 40%, and/or from 0% to 30%. These upward usage deviations may optionally change (e.g., reduce) after a first coat of paint is applied, such that the upward usage deviations of the remaining coats of paint will be different (and typically lower).

In these situations, the upward usage deviation of a second coat of the paint (and any subsequent coat) is less than about one half of the upward usage deviation for surface porosity 106 of the first coat. For instance, if the upward usage deviation of the first coat is 30% due to surface porosity (i.e., 1.3 times the baseline surface coverage for the first coat), the upward usage deviation of the second and any subsequent coat may each be less than about 15% (i.e., less than about 1.15 times the baseline surface coverage for the second coat, and for each of the subsequent coats). In further examples, the upward usage deviation of a second coat of the paint (and any subsequent coat), is less than about one third of the upward usage deviation for surface porosity 106 of the first coat.

The number of coats 108 refers to the number of coats of the paint that will be applied to Surface 1. In some embodiments, system 10 may automatically generate the number of coats 108, at least in part, by the difference between a desired final surface texture 126 after painting and the initial surface texture 118 prior to the painting. In these embodiments, system 10 may prompt the user to input or select the desired final surface texture 126 for Surface 1, such as with a scrolling list corresponding to sliding scale 124, a scrolling list of texture values (e.g., very rough, rough, moderately rough, moderately smooth, smooth, and very smooth), and/or a text-enterable field.

During typical painting applications, the final surface texture after painting is rarely rougher than the initial surface texture prior to painting. This is because the one or more coats of paint typically smooth the surface. As such, system 10 may use surface texture 118 as a roughness limit for the desired final surface texture 126. For instance, system 10 may hide or otherwise block access to texture options for the painted surface that are rougher than the texture value of surface texture 118. Alternatively, system 10 may display a notification on user interface 60 to inform the user when the final surface texture 126 is rougher than the texture value of surface texture 118.

On the other hand, the user might desire the painted surface to be smoother than the texture value of surface texture 118, and select a texture value for final surface texture 126 that is significantly smoother than the texture value of surface texture 118. In this case, system 10 may determine how many additional coats of paint will be required to change the texture value from that provided in surface texture 118 to that selected for final surface texture 126.

In further embodiments, system 10 may automatically generate the number of coats 108, at least in part, by the difference between the surface color 128 prior to painting and the selected paint type and color 102. In these embodiments, system 10 preferably generates surface color 128 with the selection of surface material type 116, and can be ascertained from the color data of the pixel arrangements in image files 78, digital model 82, and/or a close-up image. For instance, system 10 may identify the average color and luminosity values (e.g., in a LAB color system) for Surface 1, and apply those values as the color data for surface color 128. Alternatively, system 10 may prompt the user to input or select the surface color 128 for the current surface, such as with a color palette, a configurator menu, a scrolling list, and/or a text-enterable field.

The color of the selected paint and the initial color of the surface being painted can potentially affect the amount of coats needed, particularly when going from a dark surface color to a light-colored paint (e.g., dark red to white). In this case, a painter may potentially need to apply more coats of the light-colored paint to mask the underlying dark color. Accordingly, system 10 can optionally compare the color data of the surface color 128 and paint color 102, and determine whether the change in color exceeds a dark-to-light threshold value. The dark-to-light threshold value corresponds to a color change, from a dark color to a light color, at which one or more additional coats of paint will be needed to adequately cover the surface and mask the underlying color.

As can be appreciated, the number of coats 108 can significantly increase the amount of paint needed to adequately cover a surface, such as by 200%, 300%, or even more, depending on the particular painting conditions. As mentioned above, however, the effects of other factors, such as surface porosity, can in some situations decrease after the first coat has been applied. As such, a second coat of paint may only increase the amount of paint needed by 80% rather by 100%, for example. In addition to increasing the amount of paint needed, the number of coats 108 may also significantly increase the labor requirements for painting each surface.

In some instances, painter efficiency 110 may also be based on the surface type 130 of Surface 1, such as whether Surface 1 is a sidewall, an eave (e.g., a soffit), trim, a door, a garage door, or the like). Individual painters may be more skilled at painting certain surface types compared to other surface types (e.g., sidewalls versus trims). System 10 may optionally generate surface type 130 while identifying the coatable surface types for home 12 (or other structure), such as discussed above for step 52 (shown above in FIG. 3), for example.

Additionally, for painter efficiency 110, in embodiments in which system 10 uses feedback information data 100, system 10 may optionally generate an upward or downward usage variation of the paint for each painter or group of painters, such as based on their particular skills, techniques, and standards of quality. This usage variation may be assigned to painter efficiency 110. For instance, if a given painter has a history of a certain level of paint-use efficiencies, system 10 may generate a downward usage variation of −5% for painter efficiency 110. As discussed above, this deviation percentage is preferably updated with feedback information data 100, allowing system 10 to learn each user's preferences in a manner that can assist them during subsequent painting applications.

In some embodiments, system 10 may optionally prompt the user to enter painter efficiency 110, such as a known upward or downward usage variations for a given painter or groups of painters. For this feature, system 10 may provide a scrolling list and/or a text-enterable field, such as a scrolling list of percentage values ranging from −20% to 50%, from −15% to 25%, and/or from −10% to 15%, for example.

System 10 may also prompt the user to input or select the expected environmental conditions 112. Each of these factors can also affect the amount of paint needed due to temperature, humidity, precipitation, time of day, and the like, as well as labor requirements. For this feature, system 10 may provide a user-selectable menu of the time of day when the painting is expected to occur, a corresponding scrolling list, and/or a text-enterable field.

For example, in some embodiments, system 10 may provide a calendar menu, where the user may select the year, month, day, and time of day to perform the painting application. In this case, system 10 may look up the expected environmental conditions from an internet site or dedicated service (e.g., a weather service), and automatically generate the expected environmental conditions 112.

In some cases, system 10 may also display a notification on user interface 60 to inform the user if the expected environmental conditions 112 fall outside of the recommended conditions for using the selected paint type 102. For example, if the temperature in the morning of a selected day is forecast to be below the recommended temperature for using a given paint type, system 10 may notify the user of this, and optionally provide a list of recommended alternative paint types in inventory data 74*b*, such as those with wider temperature windows.

As discussed above, after being generated, selected, and/or inputted, system 10 may optionally use the resulting CA information data 92 to generate CF data 94 for Surface 1, where CF data 94 may be a function of the baseline surface coverage, and an upward or downward usage variation from this baseline surface coverage (e.g., as shown in Equation 1). System 10 may then use the CF data 94 and the surface area data 90 for Surface 1 to determine the amount of paint (or other coating) needed to adequately cover Surface 1 (for a given level of quality), and save this as paint amount data 96.

In addition, system 10 may also optionally use surface area data 90, CA information data 92, CF data 94, and/or paint amount data 96 to determine required labor times and/or costs for performing the painting applications, such as for prepping each surface (e.g., cleaning each surface), for painting each surface, and/or for any post-painting steps. System 10 may then save this a labor data 98.

From there, system 10 can use the calculated paint amounts and/or the calculated labor requirements for a variety of purposes, such as for purchasing the paint and/or for hiring a painter to paint home 12, for preparing and/or submitting a bid proposal, and the like. Preferably, system 10 may also receive feedback information data 100 about the painting application, such as information relating to the accuracy of the determined paint amounts, the accuracy of the determined labor requirements, details of the painting application, and the final results of the painting application. This can be used to update painter efficiency 110 for subsequent determinations of coating amounts and labor requirements with system 10, which allows system 10 to tailor the calculated results to each user based on their particular skills, techniques, and standards of quality.

Accordingly, system 10, with one or more mobile devices 14 and network center 16, is capable of quickly determining the amounts of paint or other coatings needed to adequately cover one or more surfaces of a structure (e.g., home 12) at a desired quality level, as well as associated labor requirements. Furthermore, mobile devices 14 are convenient, easy to operate tools that can provide on-demand calculations of the coating amounts, as well as mechanisms for purchasing the coatings, for providing meaningful feedback options, and inventory updates. This can significantly reduce labor times and improve cost analyses for a variety of commercial painters, as well as for individual users and hobbyists.

Although the present disclosure has been described with reference to preferred embodiments, workers skilled in the art will recognize that changes may be made in form and detail without departing from the spirit and scope of the disclosure.

The invention claimed is:

1. A method for determining coating requirements with one or more computer-based systems having one or more processors and one or more data storage devices, the method comprising:
receiving image files of a structure captured by a camera to the data storage device(s);
analyzing, with the one or more processors, pixel arrangements in the received image files to identify common pixels or pixel groups between surfaces of the structure shown in the received image files and computationally orient the surfaces shown in the received image files relative to each other to generate oriented image files;
determining, with the one or more processors, an x-y-z coordinate location for each pixel in the oriented image files;
rendering, with the one or more processors, a three-dimensional digital model of the structure based on the x-y-z coordinate locations for each pixel in the oriented image files;
analyzing, with the one or more processor(s), the three-dimensional digital model of the structure to identify one or more surfaces of the structure to be coated and to remove obstructing details from the identified surfaces of the structure to be coated;
determining, with the one or more processor(s), a surface area for each of the one or more surfaces to be coated;
storing, by the one or more data storage device(s), a baseline surface coverage representative of a surface area that can be covered by a given amount of paint for each of a plurality of paint types;
storing, by the one or more data storage device(s), an upward or a downward usage variation from the baseline surface coverage for each of a plurality of features, wherein the upward or downward usage variation for each of the plurality of features includes a percent increase or decrease in the surface area that can be covered by the given amount of paint, and wherein the plurality of features includes a paint color, a surface material type, a surface porosity, a paint applicator type, a number of coats to be applied, and a final texture of the surface after painting;
determining, with the one or more processor(s), coating application information for each of the one or more surfaces to be coated, wherein the coating application information includes the paint type and one or more of the plurality of features for each of the one or more surfaces to be coated;
calculating, with the one or more processor(s), a coverage factor for each of the one or more surfaces to be coated, the coverage factor calculated based on, the baseline surface coverage associated with the received paint type for each of the one or more surfaces to be coated and the upward or downward usage variation from the baseline surface coverage associated with each of the one or more of the plurality of features in the received coating application information;
calculating, with the one or more processor(s), a coating amount for each of the one or more surfaces to be coated based on the coverage factor and the surface area of each of the one or more surfaces to be coated; and
communicating the calculated coating amounts for each of the one or more surfaces to be coated.

2. The method of claim 1, wherein the coating application information further comprises a final surface texture, user efficiency information, or combinations thereof.

3. The method of claim 1, and further comprising:
calculating, with the one or more processor(s), labor requirements for each of the one or more surfaces to be coated based on the calculated surface area and the received coating application information; and
communicating the calculated labor requirements.

4. The method of claim 1, wherein the coating application information comprises a surface material type, and wherein the method further comprises:
comparing, with the one or more processor(s), pixel color data of one or more of the received image files to pixel color data in a material image database stored on the one or more data storage device(s);
identifying, with the one or more processor(s), a match between the compared pixel color data;
identifying, with the one or more processor(s), a surface material in the material image database for matched pixel color data; and
selecting the identified surface material as the surface material type.

5. The method of claim 1, wherein the coating application information further includes painter efficiency information, the method further comprising:

receiving feedback information to the one or more data storage device(s);

updating, with the one or more processor(s), painter efficiency information based on the received feedback information; and storing the updated painter efficiency information on the one or more data storage device(s).

6. The method of claim 1, and further comprising:

identifying, with the one or more processor(s), a surface texture for each of the one or more surfaces to be coated based on the received image files; and comparing, with the one or more processor(s), the surface texture to a final surface texture.

7. The method of claim 1, wherein the coating application information comprises a surface color generated based on the received image files, and a selected paint color, and wherein the method further comprises comparing the surface color and the selected paint color.

8. The method of claim 1, and further comprising displaying the calculated coating amount on a display screen of the computer-based system(s).

9. The method of claim 1, and further comprising:

calculating, with the one or more processor(s), a labor factor for the one or more surfaces to be coated based on the received coating application information; and calculating, with the one or more processor(s), a labor requirement for the one or more surfaces to be coated based on the calculated labor factor and the determined surface area.

10. A computer-based system for determining coating requirements, the computer-based system comprising:

one or more data storage devices configured to receive image files of a structure captured by a camera and to receive coating application information;

the one or more data storage devices further configured to store a baseline surface coverage representative of a surface area that can be covered by a given amount of paint for each of a plurality of paint types representative of a surface area that can be covered by a given amount of paint, and to store an upward or a downward usage variation from the baseline surface coverage for each of a plurality of features, wherein the upward or downward usage variation for each of the plurality of features includes a percent increase or decrease in the surface area that can be covered by the given amount of paint, and wherein the plurality of features includes a paint color, a surface material type, a surface porosity, a paint applicator type, a number of coats to be applied, and a final texture of the surface after painting;

one or more processors; and a processing module stored on the one or more data storage device(s), the processing module configured to be operated by the processor(s) to:

analyze pixel arrangements in the received image files to identify common pixels or pixel groups between surfaces of the structure shown in the received image files and computationally orient the surfaces shown in the received image files relative to each other to generate oriented image files;

determining an x-y-z coordinate location for each pixel in the oriented image files;

render a three-dimensional digital model of the structure based on the x-y-z coordinate locations for each pixel in the oriented image files;

analyze, with the one or more processor(s), the three-dimensional digital model of the structure to identify one or more surfaces of the structure to be coated and to remove obstructing details from the identified surfaces of the structure to be coated;

determine, with the one or more processor(s), a surface area for each of the one or more surfaces to be coated;

determine, with the one or more processor(s), coating application information for each of the one or more surfaces to be coated, wherein the coating application information includes the paint type and one or more of the plurality of features;

calculate, with the one or more processors, a coverage factor for each of the one or more surfaces to be coated, the coverage factor calculated based on the baseline surface coverage associated with the received paint type for each of the one or more surfaces to be coated and the upward or downward usage variation from the baseline surface coverage associated with each of the one or more of the plurality of features in the received coating application information;

calculate, with the one or more processors, a coating amount for each of the one or more surfaces to be coated based on the coverage factor and the surface area of each of the one or more surfaces to be coated; and communicate, for display on a user interface, the calculated coating amounts for each of the one or more surfaces to be coated.

11. The computer-based system of claim 10, further comprising feedback information data stored on the data storage device(s).

12. The computer-based system of claim 10, wherein the processing module is further configured to be operated by the one or more processor(s) to calculate a labor requirement for each of the one or more surfaces to be coated based on the calculated surface area and the received coating application information.

13. The computer-based system of claim 10, further comprising:

a network center having a first portion of the data storage device(s) and a first portion of the one or more processor(s); and one or more mobile devices collectively having a second portion of the data storage device(s) and a second portion of the one or more processor(s).

* * * * *